March 31, 1931.  M. E. BERLOWITZ  1,798,650
GAUGING MACHINE AND GAUGE
Filed Oct. 31, 1922   3 Sheets-Sheet 1

INVENTOR:
Max E. Berlowitz
BY
HIS ATTORNEY.

March 31, 1931.   M. E. BERLOWITZ   1,798,650
GAUGING MACHINE AND GAUGE
Filed Oct. 31, 1922   3 Sheets-Sheet 2
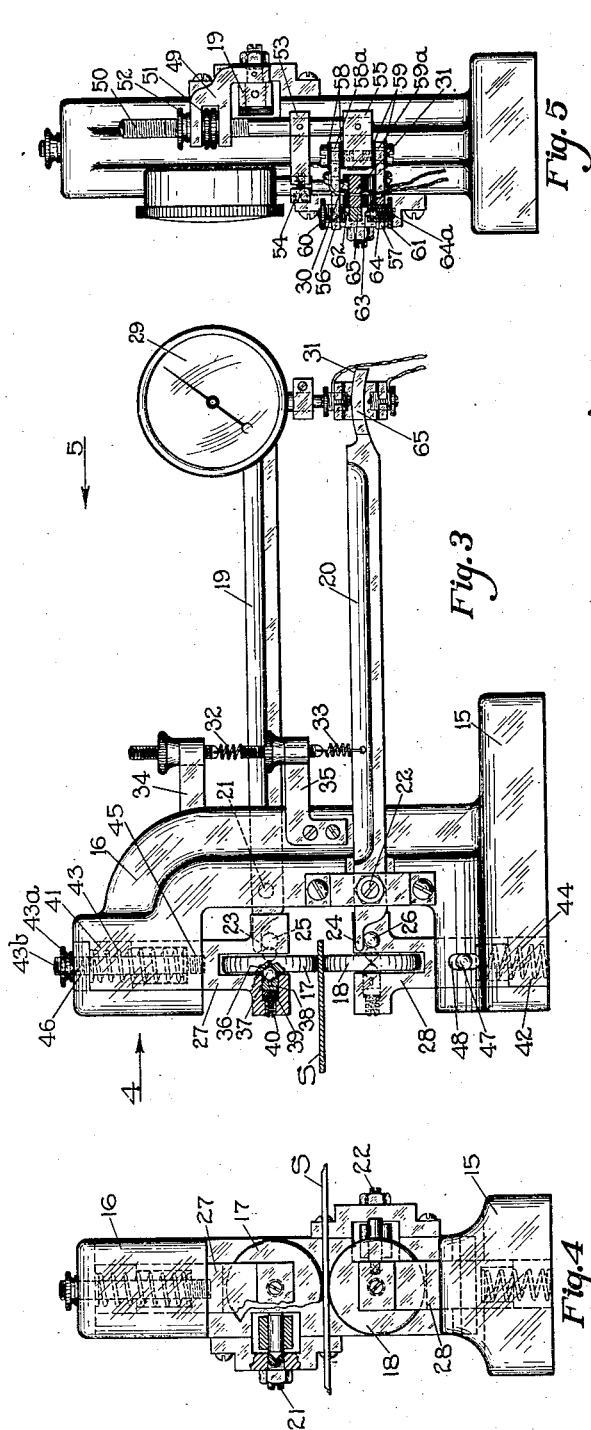
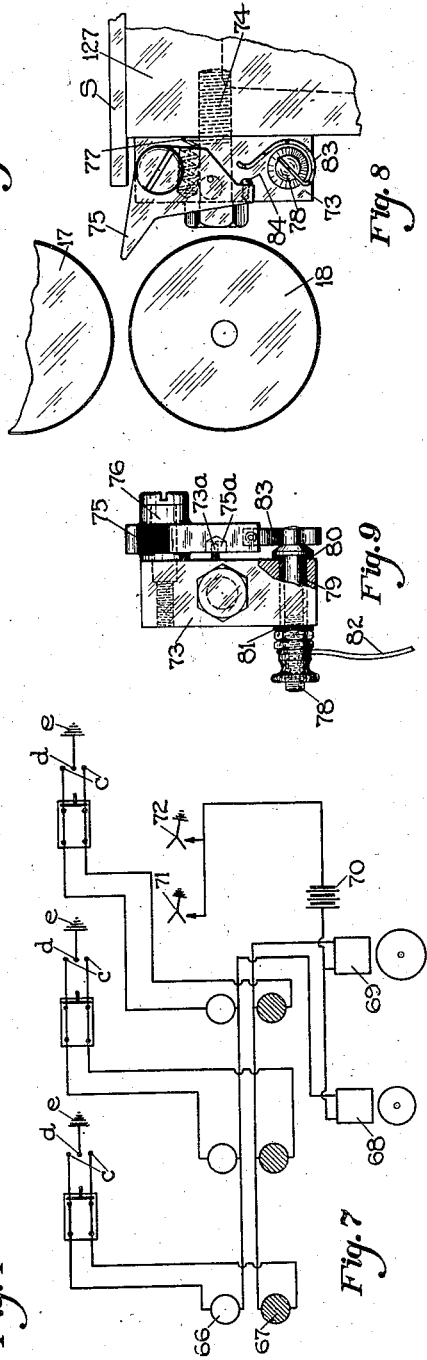
INVENTOR:
Max E. Berlowitz
BY
HIS ATTORNEY.

March 31, 1931.  M. E. BERLOWITZ  1,798,650
GAUGING MACHINE AND GAUGE
Filed Oct. 31, 1922  3 Sheets-Sheet 3
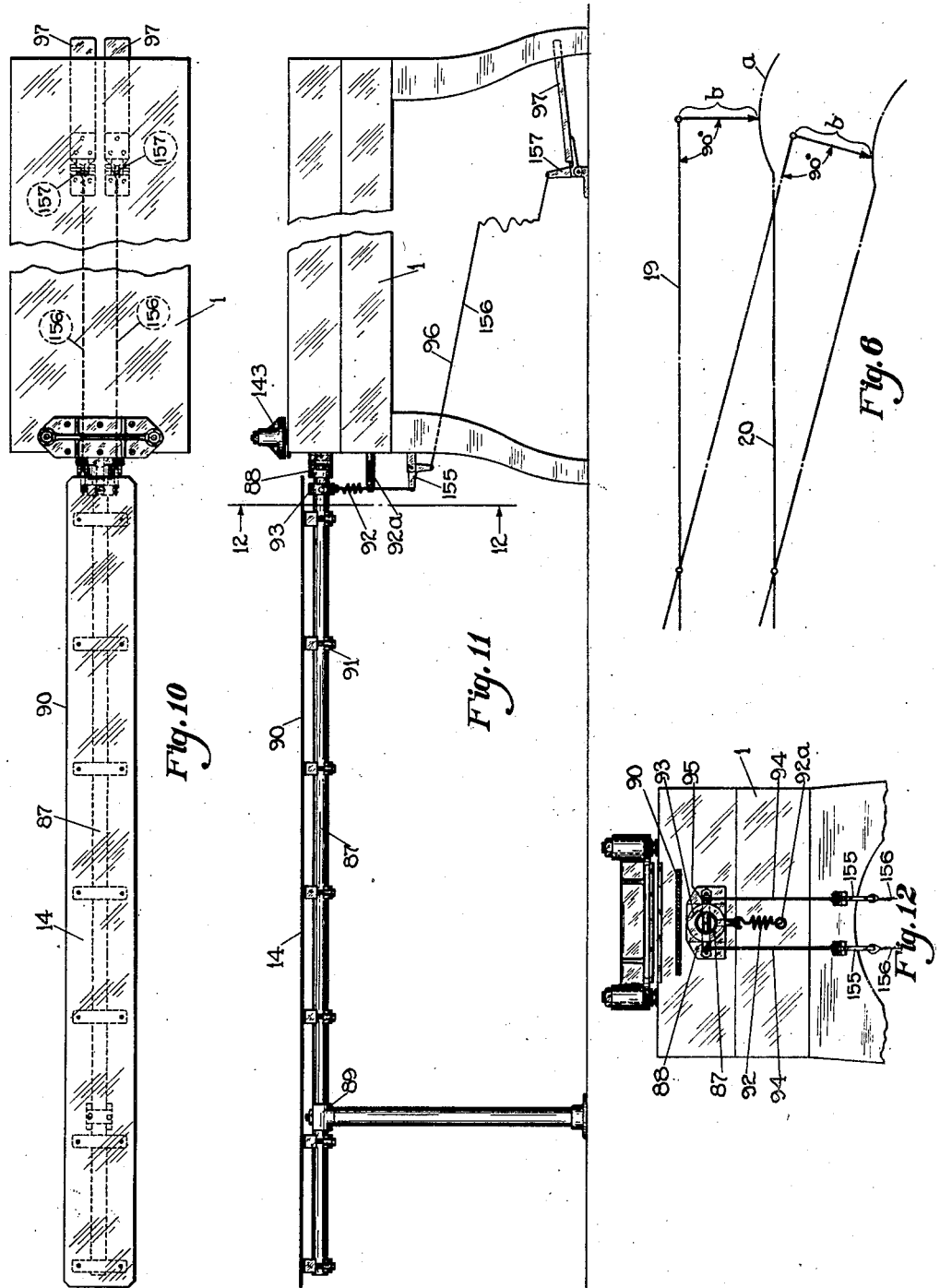
INVENTOR:
Max E. Berlowitz
BY
HIS ATTORNEY.

Patented Mar. 31, 1931

1,798,650

UNITED STATES PATENT OFFICE

MAX E. BERLOWITZ, OF BELLEVILLE, NEW JERSEY, ASSIGNOR TO GENERAL MOTORS CORPORATION, OF DETROIT, MICHIGAN, A CORPORATION OF DELAWARE

GAUGING MACHINE AND GAUGE

Application filed October 31, 1922. Serial No. 598,135.

This invention relates to machines for gauging thickness and has more particular relation to a machine for gauging the thickness of strips continuously fed thereto. While not restricted to such use, the present machine is particularly applicable to the gauging of strips of steel such as are used in the manufacture of certain types of roller bearings, the strips being cut crosswise into suitable lengths and the lengths being individually bent into annular form to make liners for the annular race-members of such bearings. With the strips destined for such a use it is evident that they should be of substantially uniform thickness throughout their lengths and crosswise thereof. The present machine provides for accurately gauging and indicating the thickness of such strips, not only continuously along their lengths but also at any desired number of points crosswise thereof, as the strips are continuously fed through the machine one after the other. Furthermore, the present machine comprises means for removing oil from the strips prior to the gauging operation, and for re-oiling the strips after the gauging operation; also it comprises means for the sorting of the strips after the gauging operation.

One object of the invention is to provide a gauging machine having the desirable characteristics above indicated.

Another object is to provide an improved gauging machine having electrical means for signalling to the operator the dimensional characteristics of the strips or other articles being gauged, as they are continuously determined by the gauging elements of the machine.

Another object is to provide a gauge for indicating the thickness of articles introduced thereto, said gauge compensating for irregularities such as waves in a sheet of material.

To these ends and also to improve generally upon machines and gauges of the character indicated, my invention consists in the various matters hereinafter described and claimed.

Without restricting the invention thereto, the same is described with more particular reference to the embodiment thereof illustrated in the accompanying drawings. In these drawings:—

Figure 3 is a side elevation of one of the gauges embodied in the machine, such gauge being illustrative of each of the plurality of gauges of the machine;

Figure 4 is an end view of the gauge illustrated in Figure 3, looking in the direction of the arrow 4 in Figure 3;

Figure 5 is an end view of the gauge looking in the direction of the arrow 5 in Figure 3;

Figure 6 is a diagrammatic view illustrating the manner of laying out the compensating end of the lever of the gauge;

Figure 7 is a conventional diagram of the electrical connections used in the machine;

Figure 8 is a fragmental side elevation showing the strip-operated switch for closing the electrical circuit during actual gauging and opening the circuit when the machine is not in use;

Figure 9 is a face view of the device illustrated in Figure 8;

Figure 10 is a plan view of the machine showing the sorting table, the major portion of the remainder of the machine being broken out to economize space;

Figure 11 is an elevational view corresponding to Figure 10, and

Figure 12 is a sectional view taken substantially on the line 12—12 of Figure 11.

Figure 1:
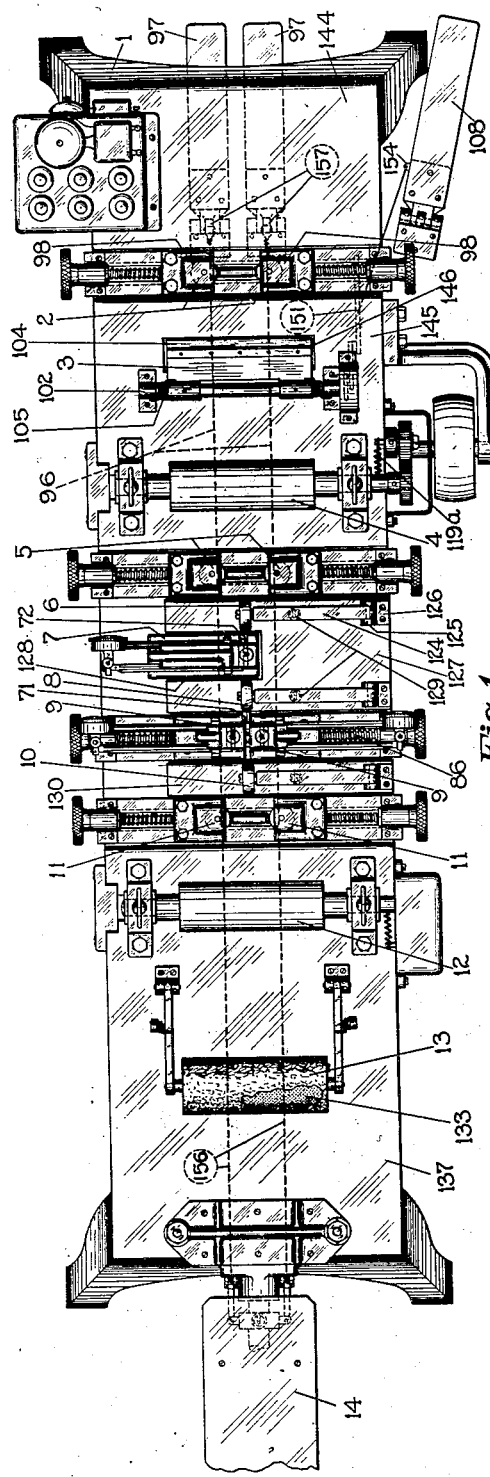
Figure 1 is a plan view of the gauging machine, as a whole, a portion of the sorting device being broken away to economize space.
Figure 2:
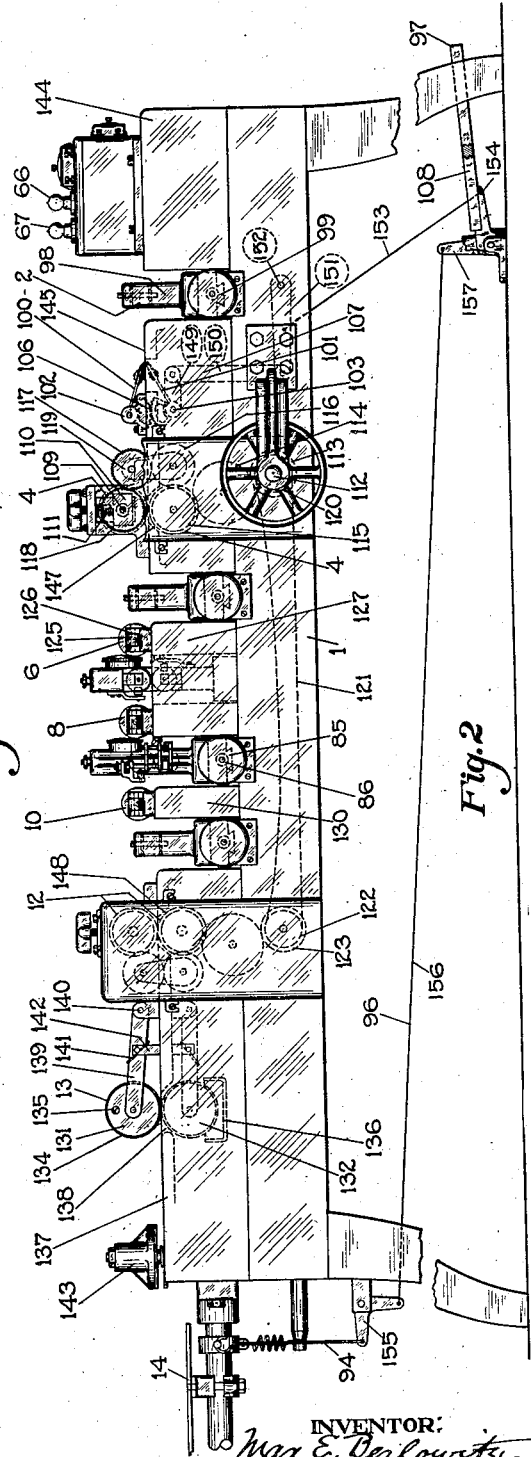
Figure 2 is a side elevation of the machine illustrated in Figure 1.

Referring now to the drawings, and for the present more particularly to Figures 1 and 2, the machine in general comprises a frame 1 upon which the various elements are suitably carried and attached as will be understood by those skilled in the mechanic arts; as illustrated the receiving end of the machine is at the right. Proceeding from right to left, the frame carries rollers 2, 2 for guiding the strips to be gauged; wiping device 3 for removing oil from the strips; driven feed rollers 4, 4; guide rollers 5, 5; a flattening roller 6; a gauging device 7 for gauging the strip substantially along its longitudinal axis; a flattening roller 8; a pair of gauging devices 9, 9 for gauging the strip at each side of its longitudinal axis; a flattening roller 10; guide rollers 11, 11; driven drawing-out feed rollers 12, 12, and a re-oiling device 13. At its left-hand end the frame carries the sorting table 14 for sorting the strips into those which the machine has shown to be of proper thickness, and those which the machine has shown to be of improper thickness. In operation, the strips as fed one after another to the machine at the right are held against sidewise movement by the rollers 2, 5 and 11 and held against vertical movement immediately adjacent the gauges 7 and 9, 9, by the rollers 6, 8 and 10. As the strips are moved along the machine by the rollers 4, 4 and 12, 12 they are wiped free of oil by the wiping device 3, gauged along their center by the gauging device 7, gauged at each side of the center by the gauges 9, 9, re-oiled by the device 13, discharged to the sorting table 14, and sorted by the operation of the table.

In particular accordance with the invention each of the gauges 7 and 9 is preferably as now to be described, particular reference being made to Figures 3 to 6 inclusive, the gauge there illustrated (which for definiteness may be taken as the gauge 7) being typical of the others. The gauge, in general, comprises a base 15 suitably connected to the frame 1 and carrying the standard 16 which latter supports the gauging elements proper.

These elements comprise the rollers 17 and 18 for contact with the upper and lower faces of the strip S to be gauged. These rollers are held yieldably in the frame 15—16 and urged toward the strip S, thereby to accommodate themselves to variations in thickness of the strip. To multiply and indicate the changes in position of the rollers 17 and 18, thereby to indicate the thickness of, and the variations in thickness of, the strip S, the rollers are operatively correlated with a pair of multiplying levers 19 and 20. These levers are fulcrumed on the standard 16 as indicated at 21 and 22 and have their short arms 23 and 24 contoured, as shown, to cooperate with actuating pins 25 and 26 carried by the blocks or slides 27 and 28 which act as floating carriers for the rollers 17 and 18. The long arm of the lever 19 carries a dial indicator 29 of the usual type and having the actuating plunger 30 resiliently urged outward by spring mechanism (not shown) within the indicator. The other lever, 20, is provided with a portion 31 located to be contacted by the plunger 30. To hold the ends 23 and 24 of the levers 19 and 20 in contact with the pins 25 and 26 the levers are connected with contracting springs 32 and 33 adjustably carried by brackets 34 and 35 on the standard 16. With this arrangement it will be seen that, as the strip S is passed between the rollers, its thickness, as well as variations in its thickness, will be indicated by the dial indicator 29.

It is to be particularly noted with reference to the above described construction that it is such that variations in thickness of the strip will be correctly indicated at all times; that is to say, should there be a wave in the strip, but the thickness of the strip be the same at the wave as it is at each side of the wave there will be no variation in thickness indicated, whereas if the thickness of the strip be different at the wave from the thickness at either side of the wave such variation in thickness will be correctly indicated. This is because the rollers 17 and 18 can both move upward and downward simultaneously or float with the article if the latter is displaced from a normal position, and the long arms of the levers 19 and 20 correspondingly move. For example, referring to Figure 3, should the strip S be moved upward in the figure, which movement in practical effect corresponds to an upward wave in the strip, the rollers 17 and 18 would correspondingly move upward; and, since they move upward together without change of distance between them, there will be no movement of the mechanism of the dial indicator, and no indication of a (non-existent) variation in thickness of the strip given.

To insure high accuracy in the indicating, the portion 31 of the lever 20 is, instead of being straight, of a shape to compensate for such changes in the perpendicular distance between the ends of the long arms of the levers as occur as the levers swing through equal angles (the levers being mounted on non-coincident fulcrums). Thus, referring to the diagrammatic view in Figure 6 the curve $a$, which may be taken as representing either the upper or lower curved surface of the portion 31, is so laid out, that the perpendicular distance $b$ from the lever 19 to the surface 31 of the lever 20 is a constant. For illustration, the line defining the distance $b$ may be taken as the plunger 30 of the dial indicator; and it is evident that as the levers swing through the same angles about their respective fulcrums there will be no actuation of the plunger by the portion 31, since the distance $b$ from the lever 19 to the part of the portion 31 in perpendicular alignment with the lever 19 is a constant.

As to the detailed construction of the illustrated gauge, the strip-contacting rollers are shown as rotatably carried in the before-mentioned carrying blocks or slides 27 and 28. To thus carry them the rollers are provided with seats, as 36, in which is received a ball 37 which is also received in a hardened steel bearing 38 backed up by a brass thrust plug 39 and an adjusting screw 40, carried by the carrying block. The carrying blocks are held in sockets 41 and 42 and are urged outwardly by the expanding springs 43 and 44, each spring providing substantially constant contact pressure between one of the gauge rollers and the article. The outward movement of the carrier 27 is limited by a thumb nut 43ª on a stud 43ᵇ screwed into the carrier at 45 and free to slide through the standard 16 at 46. The movement of the carrier 28 is limited by the pin 47 projecting into the slot 48 in the side of the socket. To support the dial indicator 29 on the lever 19 such lever carries a bracket 49 which carries a spindle 50 screwed therethrough, adjustable by the turn nut 51, and held in adjusted position by the nut 52, and this spindle, in turn, carries a bracket piece 53, in the end whereof the dial indicator is clamped as indicated at 54.

I have found it highly desirable to provide indicating means, in addition to the dial indicators as 29, to visually and audibly indicate variations in the thickness of the strip as disclosed by the variation gauges. As here illustrated such means is electrical in character and is as follows:—The before mentioned dial-indicator-carrying spindle 50 (Figure 5) of each gauge, has, in addition to the bracket 53, a bracket or block 55. This block carries a pair of plates 56 and 57 fully electrically insulated from the block 55 by insulating washers 58 and 59 and insulating sleeves 58ª and 59ª. The plates 56 and 57 carry contact screws 60 and 61 adjustably mounted therein, which screws carry contact points 62 and 63, desirably of silver, slidably held therein and backed up by an expanding spring 64 and a closing set screw 64ª. The contact points 62 and 63 are in operative position with respect to a (desirably silver) contact plate 65 carried by the lever 20 and conforming to the curvature of the portion 31. As is evident, by adjusting the screws 60 and 61, the distance between them may be varied, and therefore the distance that the levers must move with respect to each other before contact is made, be varied; if desired, screws 60 and 61 may be provided with suitable graduations (not shown) indicating advance or retreat of the screw upon turning. Evidently the distance between the contact points may be varied in correspondence with the tolerance it is intended to allow in the strips being gauged. The contact points provide control members to control the completion of an electric circuit, as will appear, and move in response to dimensional changes in the article.

The plates 56 and 57 and the lever 20 are in a suitable electric circuit, as will be understood. In Figure 7 a circuit is conventionally and diagrammatically shown. Therein the contacts 62 and 63 on the levers 19 are indicated at c, c, c, while the contacts 65 on levers 20 are indicated at d, d, d, the levers 20 being grounded to the machine at e, e, e.

Suitable signal lights 66 and 67 of, say, white and red (one pair for each gauge) and bells 68 and 69 of different tone are included in the system. The battery of the system is indicated at 70 and contact devices for grounding the circuit to the machine are indicated at 71 and 72. These contact devices 71 and 72 will be described more fully below. It will suffice for the present to say that one (or both) of them is (or are) operated by the strip S in the machine to establish the ground. As will be understood by those skilled in the art, with either of the devices 71 and 72 closed, if there is a variation in thickness which causes contact to be made at any one of the gauges the signals will be energized, a white light and the bell 68 if contact is made, for example, between a lever 20 and the upper contact point 62, and a red light and the bell 69 if contact is made between a lever 20 and the lower contact point 63. Obviously, as shown the pairs of lights selectively signal what is occurring at the individual gauges while the bells signal for any one or all of the gauges without selection. It will be understood that the machine is of suitable current transmitting material as steel.

Referring now more particularly to Figures 8 and 9 there is shown a grounding device as 71 or 72. The purpose of these devices is to provide that the signal circuit shall be open when there is no strip in the machine, thereby to insure that the battery shall not be exhausted by useless passage of current through the system and to prevent operation of signalling devices. Desirably a grounding device is mounted on the hereinafter named table piece 127 in front of the gauge 7 and another in front of the gauges 9, 9 (see Figure 1). As shown, a grounding device or switch comprises a base 73 attached to the table piece 127 by the screw 74 and carrying a finger 75 pivoted thereto at 76, the finger being urged upward, by the expanding spring 77, the movement being limited by the stop pin 73ª carried by the base 73 and projecting into the recess 75ª in the finger. The base 73 also carries a stud 78 which is fully insulated from the base as by the tube 79 and washers 80 and 81 of suitable electrical insulating material. To the stud 78 is bound the lead wire 82 connected with the battery. The stud 78 carries a phosphor-bronze contact spring 83, and the finger 75 carries a silver contact point 84 for cooperation therewith. In operation, when there is no strip in contact with the finger 75 the same is held in such a position that its contact point 84 is out of contact with the spring 83; but when a strip S contacts the finger 75 the same is depressed and contact made between the elements 83 and 84, which grounds the circuit to the machine so that if contact be made between the piece 65 of a lever 20 and either cooperative contact point carried by the lever 19 the signals will be energized.

Referring now to Figures 1 and 2, the gauge 7 is preferably stationarily mounted on the base 1 in substantially central position with respect to the strips to be gauged. The gauges 9, 9 for gauging the strip at each side of its central axis are preferably mounted upon the base so that they may be shifted toward and from such axis in order to vary the distance from the central axis at which gauging by the gauges 9, 9 shall occur. As here shown the gauges are carried in guides 85 and have threaded through their bases a screw-threaded rod 86 fixed against longitudinal movement; as the rod is turned the gauges will be advanced or retracted. As here shown both gauges 9 are actuated by a single rod 86 and the rod is so threaded that the gauges will advance toward or retreat from each other.

Referring now more particularly to Figures 10, 11 and 12 the sorting table heretofore mentioned and designated generally as 14 comprises the carrying shank or shaft 87 supported for oscillative movement in the block 88, carried by the frame 1, and in the upper end of the support or standard 89. The table proper 90 is carried fast upon the shank 87 by the members 91 clamped to the shank. The shank is normally held from oscillation by the contracting spring 92 connected to a collar 93 fast on the shank, the other end of the spring being held to the frame at 92$^a$. To oscillate the shank, thereby to tip the table about its longitudinal axis, the shank is provided at each side with a rod 94 connected to an arm 95 carried by the collar 93. Each rod is connected by suitable linkage 96 (Figure 11) to a foot treadle 97 located at the receiving end of the machine. Upon depressing one of the treadles 97 the table will be tilted in one direction, and by depressing the other treadle 97 the table will be tilted in the other direction. When a strip which has been gauged reaches the table the workman depresses one or the other of the treadles 97 to discharge the strip to the right or the left, he, for example, discharging the strips of proper thickness to the left and the strips of improper thickness to the right.

Again referring to Figures 1 and 2, the various units, as the feeding rollers, oil wiping device, etc., heretofore previously briefly mentioned, may desirably be substantially as shown. As illustrated, the guide rollers 2, 2, 5, 5, and 11, 11, are all carried upon the frame 1 in substantially the same manner. That is, a roller, as 2, is mounted to rotate about its vertical axis in a carrying structure 98, this structure being mounted in a guideway 99 to be shifted forward and back, crosswise of the bed. Desirably, a pair of rollers as 2, 2 is mounted and connected substantially as are the gauges 9, 9, as heretofore described.

The oil wiping device heretofore generally designated as 3 comprises a pair of plates 100 and 101 mounted, as indicated at 102 and 103 on axes extending crosswise of the path of the strips to swing toward and from the strips. The wiper plates desirably carry at their strip-contacting edges suitable wiping material, as canvas or felt, as indicated at 104. The plate 100 is urged toward plate 101 by springs 105 on its axis. The shanks of the plates carry meshing toothed segments 106 to couple the plates together to move toward and away from each other. To the shank of the plate 101 is coupled a linkage designated generally as 107 and connecting the shank with a foot treadle 108. As is evident, by depressing the foot treadle the workman can open the plates 100 and 101 to admit a strip between them, and upon release of the treadle the springs 105 will close the plates upon the strip to wipe the oil from the same.

The feed rollers, heretofore designated as 4, 4, comprise an upper roller and a lower roller as shown, so mounted as to exert a grasping pressure upon the strip to feed it through the machine as the rollers are driven. In the present instance the upper roller has its shaft 109 carried at each end in a vertically slidable journal box 110, which journal box is forced downward by the expanding spring 111 in the well known manner. The rollers are driven from the power shaft 112 through the gears 113, 114, 115, 116, 117 and 118. The gears 115 and 118 are fast to the shafts of their respective rollers, while the gear 117 is carried by a swinging plate 119, urged toward the gear 118 by the contracting spring 119$^a$, permitting the gear 117 to accommodate itself to the various positions assumed by the gear 118 as it shifts with the shaft 109 and so maintain the gears 116, 117, and 118 always in mesh. The pulling-out feed rollers 12, 12 are mounted and driven substantially as are the rollers 4, 4. They are driven from the power shaft 112 by the sprocket 120, chain 121, sprocket 122, and gear 123.

The flattening rollers heretofore mentioned and designated as 6, 8 and 10 are located substantially at the longitudinal axis of the machine, i. e. at the longitudinal axis of the strips to be gauged, and closely adjacent the gauging devices, and serve to depress the strip into proper position to pass between the rollers of the gauging devices. As illustrated, each roller is carried upon a lever 124, fulcrumed at 125 in a bracket 126, carried by the support 127, which latter is carried by the machine frame. The support 127 is cut out as indicated at 128 to straddle the gauge 7 and presents a table for the strip at each side of the gauge and lying in the plane of the gauging space between the rollers. A spring 129 serves to draw down the lever 124 to cause the roller to bear on the top of the strip and depress it against the top of the support 127, thus to flatten it against the same and prepare it for passage between the rollers of the gauging device. The flattening roller 10 is mounted as are the rollers 6 and 8 but is carried on a support 130 functioning as does the support 127 but separate from and spaced from the support 127 to admit the gauge devices 9, 9 between the supports 127 and 130 as shown.

The re-oiler, previously designated generally as 13, comprises the roller 131 and the roller 132 so mounted as to be urged toward the top and the bottom side of the strip respectively. The upper roller may conveniently comprise a perforated shell 133 with closed ends (see Figure 1) and covered with suitable absorbent material 134 and adapted to be filled with oil as at 135. The lower roller 132 runs in a bath of oil 136. As shown, the roller 132 is mounted below the surface of the table piece 137 and reaches to the surface of such table piece through a slot 138 in the table piece. In order to so mount the rollers that they may be urged toward the strip they are carried at each end upon levers as 139 fulcrumed at 140, and the lever is drawn toward the strip by a coiled spring 141 attached to the lever and to the standard 142. Beyond the re-oiler 13 the table piece 137 desirably carries a bridge-like guide 143 for directing the strips to the sorting table 14.

As will be understood the various table-like portions 144, 145, 127, 130 and 137 are mounted upon the frame 1 to place their tops in substantially horizontal alignment and present a series of aligned supports for the traveling strips. Also, the rollers of the gauge devices and those of the feed rollers are so located as to bring the receiving spaces between mating rollers in substantial alignment with the tops of the various supports, and the guiding rollers 2, 5 and 11 are so located that they properly contact the edges of the strips. As shown the table portions 145 and 137 are provided with suitable openings, as 146, 147 and 148 providing for proper location of the lower units of pairs of elements such as the wiper 101, and so forth. It is believed that the operation of the illustrated machine in the gauging and sorting of strips will be plain without an extended recital thereof; it might be remarked that the strips before mentioned are of considerably greater length than the distance between the gauges 7 and 9 in the particular machine I have used, and the strips are continuously fed end to end.

While for definiteness and exactness in description, I have described the illustrated machine as used for the gauging of steel strips, and have described in considerable detail the various structural expedients used in practically embodying the invention in a machine, it will be understood that machines embodying the invention are adapted to a wide variety of uses and that the structural details here shown and described may be greatly departed from, without departing from the invention.

It will be seen that I have provided a machine with the aid of which strip material may be continuously and accurately gauged for thickness and variations in thickness disclosed by the machine and continuously signaled to the operator.

The before mentioned linkage 107 (Figures 1 and 2) comprises a crank 149 on the bearing shank of the plate 101, a link 150 connecting the crank and a lever 151 pivoted at 152, and a pull rod 153 connected to the lever and to the treadle 108, as indicated at 154. Each before mentioned linkage 96 (Figure 11) comprises a bell crank 155, to the arms of which are connected the related rod 94 and pull rod 156, which latter is connected with the arm 157 of the related treadle 97.

I claim:

1. In a gauging machine, a pair of gauge elements for contacting with the opposite sides of a sheet of material, means for feeding the sheet of material past the gauge elements, means controlled by the gauge elements for indicating the dimensional characteristics of the material, and a mounting for said gauge elements comprising floating blocks movable simultaneously for gauging of the sheet of material in different planes parallel to the normal path of the sheet; substantially as described.

2. In a gauging machine, a pair of gauge elements for contacting with the opposite sides of a sheet of material, means for feeding the sheet of material past the gauge elements, means controlled by the gauge elements for signalling the dimensional characteristics of the material, a floating mounting for said gauge elements, and means for compensating for differences in the positions of said gauge elements; substantially as described.

3. In a gauging machine, a pair of gauge elements for contacting with the opposite sides of a sheet of material, means for feeding the sheet of material past the gauge elements, spring controlled blocks for yieldingly holding the gauge elements against opposite sides of the material at varying levels, and means controlled by relative movement of the gauge elements for indicating the dimensional characteristics of the material; substantially as described.

4. In a gauging machine, a pair of gauge elements for contacting with the opposite sides of an article, floating carriers for said gauge elements, pivoted levers controlled by said carriers and having cooperating electric contacts normally out of engagement, and means controlled by said contacts for signalling variations in the dimensional characteristics of the article; substantially as described.

5. In a gauging machine, a pair of gauge elements for contacting with the opposite sides of an article, floating carriers for said gauge elements, pivotal levers controlled by said carriers, an indicator carried by one of said levers, and a convexly curved portion on the other lever for engagement with the indicator; substantially as described.

6. In a gauging machine, a pair of gauge elements for contacting with the opposite sides of a sheet of material, means for feeding the sheet of material past the gauge elements, electrically operated means for signalling the dimensional characteristics of the material, said means being controlled by the gauge elements, and a switch in the path of the sheet of material being fed for rendering the electric signalling means operative or inoperative; substantially as described.

7. In a gauging machine, in combination, a plurality of gauging devices for gauging the article at a plurality of points, and means for visually and audibly signalling the dimensional characteristics disclosed by said devices, said means being selective with respect to the individual gauging devices in visual signalling and non-selective in audible signalling; substantially as described.

8. In a gauging machine, in combination, a plurality of gauging devices for gauging the article at a plurality of points, and means for visually and audibly signalling the dimensional characteristics disclosed by said devices, said means being selective with respect to the individual gauging devices in visual signalling and non-selective in audible signalling, and providing for simultaneous visual and audible signalling; substantially as described.

9. In a gauging machine, in combination, a supporting structure presenting a travel path for the article to be gauged, and a plurality of gauging devices arranged along said path for gauging the article along its length, said devices being arranged in non-alignment longitudinally of the travel path thereby to gauge the article at a plurality of points crosswise thereof, and means for shifting certain of said devices crosswise of said path; substantially as described.

10. In a gauging machine, a supporting structure presenting a travel path for the article to be gauged, a gauging device arranged in said path, means constituting an electric circuit, with said device included therein, and including a unit for signalling dimensional characteristics disclosed by said device, and a normally-open circuit breaker for said circuit arranged in said path and adapted to be closed by the article to be gauged; substantially as described.

11. In a gauging device, in combination, a pair of elements for contact with the article to be gauged, a pair of multiplying levers non-coincidently fulcrumed and connected each with a respective article-contacting element, indicating means associated with one of said levers and arranged for actuation by the other, and means carried with such other for performing such actuation, such means being of compensating character to compensate for changes in distance between the levers as they swing through equal arcs; substantially as described.

12. In a gauging device, in combination, a pair of elements for contact with the article to be gauged, a pair of multiplying levers non-coincidently fulcrumed and connected each with a respective article-contacting element, electric contacts carried by said levers for cooperation, and means constituting an electric circuit including said contacts and a signalling device, and compensating means on one of said contacts to compensate for changes in distance between the contacts as the levers swing through equal arcs; substantially as described.

13. In a gauging device, in combination, a supporting structure, a pair of opposed article-contacting rollers carried by said structure to receive the article between them, sliding blocks yieldingly mounted in said structure and carrying each a said roller rotatably borne with respect thereto, a pair of multiplying levers carried by said structure, means connecting each lever with a respective sliding block for actuation thereby, and indicating means carried by one lever for actuation by the other; substantially as described.

14. In a gauging device, in combination, a supporting structure, a pair of opposed article-contacting rollers carried by said structure to receive the article between them, sliding blocks yieldingly mounted in said structure and carrying each a said roller rotatably borne with respect thereto, a pair of multiplying levers carried by said structure, means connecting each lever with a respective sliding block for actuation thereby, electric contacts carried by said levers for cooperation, and means constituting an electric circuit including said contacts and including a signal device; substantially as described.

15. In a gauging device, in combination, a supporting structure, a pair of opposed article-contacting rollers carried by said structure to receive the article between them, sliding blocks yieldingly mounted in said structure and carrying each a said roller rotatably borne with respect thereto, a pair of multiplying levers carried by said structure, means connecting each lever with a respective sliding block for actuation thereby, electric contacts carried by said levers for cooperation, means constituting an electric circuit including said contacts and including a signal device, and indicating means carried by one lever for actuation by the other; substantially as described.

16. In a device of the character described, a pair of gauge elements for contacting with the opposite sides of an article, floating supporting means for the gauge elements to allow them to simultaneously follow displacement of the article from a normal position, said floating supporting means comprising a slide for at least one of the gauging elements, a multiplying lever actuated by the slide, a contact member floating under control of the other gauge member, and an electric circuit controlled by the relative movement of the lever with respect to the contact member; substantially as described.

17. In a device of the character described, a pair of gauge elements for contact with opposite sides of an article, means for causing a movement of the article to bring different portions thereof into contact with the gauge elements, a carrier, for each gauge element, each carrier being movably mounted and having mechanism for effecting substantially constant pressure contact between each said gauge element and the article in any position of the article whereby both gauge elements can simultaneously and bodily follow displacement of the article in either direction from normal position, an electric circuit, a pair of movable control members for controlling the circuit, pivoted elements providing operating connections between the control members and the carriers to produce relative movement of the control members corresponding to changes in dimensional characteristics of the article; substantially as described.

18. In a device of the character described, a pair of gauge elements for contact with opposite sides of an article, a carrier, for each gauge element, each carrier being movably mounted and having mechanism for effecting substantially constant pressure contact between each said gauge element and the article in any position of the article, an electric circuit, a pair of movable control members for controlling the circuit, each control member having operating connections with one of the gauge elements for movement thereby to produce relative movement of the control members corresponding to changes in dimensional characteristics of the article, and said movable mounting of the gauge elements and carriers providing for their simultaneous and bodily displacement with the article without affecting the relatively size-controlled positions of the control members; substantially as described.

In testimony whereof, I hereunto affix my signature.

MAX E. BERLOWITZ.

CERTIFICATE OF CORRECTION.

Patent No. 1,798,650.                                                       Granted March 31, 1931, to

MAX E. BERLOWITZ.

It is hereby certified that error appears in the printed specification of the above numbered patent requiring correction as follows: Page 7, line 57, claim 18, for the word "relatively" read relative; and that the said Letters Patent should be read with this correction therein that the same may conform to the record of the case in the Patent Office.

Signed and sealed this 30th day of June, A. D. 1931.

(Seal)                                                                              M. J. Moore,
                                                                                       Acting Commissioner of Patents.